(No Model.)
E. A. SHERMAN.
BELT FASTENER.
No. 416,509. Patented Dec. 3, 1889.
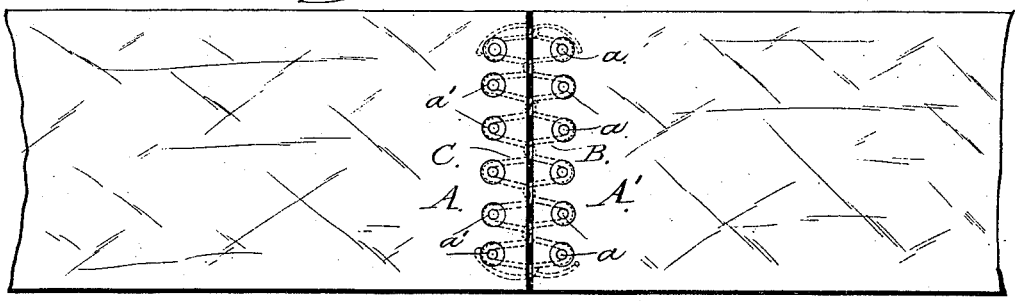
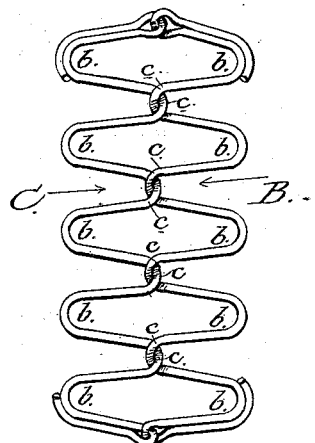 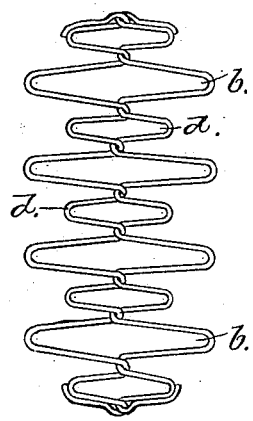
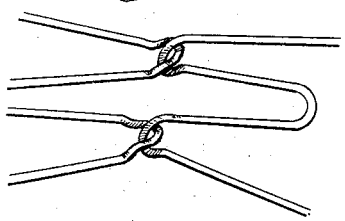
WITNESSES
T. W. Fowler,
W. H. Patterson
INVENTOR
Eugene A. Sherman
by A. H. Evans & Co.
Attorneys

United States Patent Office.

EUGENE A. SHERMAN, OF STEVENS POINT, WISCONSIN.

BELT-FASTENER.

SPECIFICATION forming part of Letters Patent No. 416,509, dated December 3, 1889.

Application filed September 21, 1889. Serial No. 324,668. (No model.)

*To all whom it may concern:*

Be it known that I, EUGENE A. SHERMAN, a citizen of the United States, residing at Stevens Point, in the county of Portage and State of Wisconsin, have invented certain new and useful Improvements in Belt-Fasteners, of which the following is a full and clear description, reference being had to the accompanying drawings, forming part of this specification, in which—

Figure 1 represents a portion of a belt with my improved fastener in position uniting the meeting ends thereof. Fig. 2 is a view of the fastener detached. Fig. 3 is a view of modified form. Fig. 4 is a detail to be referred to.

My invention relates to means for securing the meeting ends of belts by a hinged joint or connection; and it consists in the improved fastening device, which I shall hereinafter fully describe and claim.

To enable others skilled in the art to make and use my invention, I will now describe its construction and indicate the manner in which the same is carried out.

In the said drawings, A represents one end of a leather, canvas, or other belt, and A' is the opposite or meeting end, or the end of an adjacent section where the belt is composed of several sections or pieces.

Within the folds or layers which ordinarily compose the belt I secure by rivets $a$ one section B of my improved fastener, and in the same manner by the rivets $a'$, I secure in the meeting end of the opposite end or section A' of said belt another section C of the fastener, the said sections B and C being composed of single pieces of wire bent throughout their length in a serpentine manner, so as to form in the bends the loops $b$ and $c$. The loops $c$ interlace with each other to form a hinge-connection, and the other loops $b$ of the sections B and C are passed between the folds or material of the belt, so that the rivets $a$ and $a'$ may pass directly through the belt and these loops and be securely riveted in the usual manner. From this construction it will be observed that my fastener is composed of but two pieces of wire, each of which is manipulated so that it may interlace with the other at the inner sides to form a flexible joint or hinge at the splice, which enables the fastener to readily yield to the surface of the pulleys over which it runs, and at the same time the rivets which are commonly used in belting are adapted to pass through the bends or loops in the outer sides of the sections B and C of the fastener, and thereby securely hold the same in position and permitting the splice to pass over the pulley without vibration or jar. The joint thus formed being a flexible one, the danger of the wire crystallizing is entirely avoided, and by placing the fastener within the material composing the belt there is obtained a smooth continuous surface on both faces of the belt.

The fastener is cheaply constructed and readily applied, and when in use does not damage the belt nor cause any wear upon the holes through which the rivets pass, a feature common to many fasteners.

In Fig. 3 I illustrate a fastener of modified form which is especially adapted for heavy belts. In this figure the sections of the fasteners are formed with the loops $b$, and intermediate of these loops are formed another series of shorter loops $d$, through which an addititional series of rivets may be passed to give increased strength to the belt.

If desired, these portions of the loops $c$, (see Figs. 2 and 4,) which cross each other, may be bent slightly to make a more easy joint or connection.

Having thus described my invention, what I claim as new, and desire to secure by Letters Patent, is—

1. A belt-fastener consisting of the wire sections of serpentine form interlaced together at their inner sides and having their outer sides formed with loops through which rivets are adapted to pass, substantially as and for the purpose set forth.

2. A belt-fastener consisting of two pieces of wire of serpentine form, having the loop portions $b$ and $c$, said loop portions $c$ interlacing to form a flexible joint or hinge, and the loops $b$ being adapted to enter the material of the belt and to be held by rivets, substantially as described.

EUGENE A. SHERMAN.

Witnesses:
S. A. SHERMAN,
JOHN R. MCDONALD.